United States Patent
Sakura

(10) Patent No.: US 11,794,416 B2
(45) Date of Patent: Oct. 24, 2023

(54) FABRICATION TABLE AND FABRICATING APPARATUS

(71) Applicant: Shozo Sakura, Kanagawa (JP)

(72) Inventor: Shozo Sakura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 17/209,865

(22) Filed: Mar. 23, 2021

(65) Prior Publication Data

US 2021/0299969 A1    Sep. 30, 2021

(30) Foreign Application Priority Data

Mar. 31, 2020  (JP) ................. 2020-064446

(51) Int. Cl.
*B29C 64/40*     (2017.01)
*B29C 64/245*    (2017.01)
*B33Y 40/00*     (2020.01)

(52) U.S. Cl.
CPC ............ *B29C 64/40* (2017.08); *B29C 64/245* (2017.08); *B33Y 40/00* (2014.12)

(58) Field of Classification Search
CPC ....... B29C 64/40; B29C 64/245; B33Y 10/00; B33Y 30/00; B33Y 40/00; B33Y 40/20; B22F 10/43; B22F 10/64; B22F 10/14; B22F 12/30
See application file for complete search history.

(56) References Cited

U.S. PATENT DOCUMENTS

| | | | |
|---|---|---|---|
| 5,753,274 A | 5/1998 | Wilkening et al. | |
| 9,937,702 B1 | 4/2018 | Goss et al. | |
| 2004/0018107 A1 | 1/2004 | Khoshnevis | |
| 2015/0314389 A1* | 11/2015 | Yamada | B33Y 10/00 219/76.1 |
| 2015/0343533 A1 | 12/2015 | Park et al. | |
| 2016/0075084 A1 | 3/2016 | Sakura | |
| 2016/0236422 A1 | 8/2016 | Sakura | |
| 2017/0072646 A1 | 3/2017 | Sakura | |
| 2017/0120521 A1 | 5/2017 | Sakura et al. | |
| 2017/0190120 A1* | 7/2017 | Bloome | B29C 64/393 |
| 2017/0305141 A1 | 10/2017 | Sakura | |
| 2018/0117854 A1* | 5/2018 | Hart | B29C 64/153 |

(Continued)

FOREIGN PATENT DOCUMENTS

| | | |
|---|---|---|
| CN | 105269817 A | 1/2016 |
| EP | 0734842 A1 | 10/1996 |

(Continued)

OTHER PUBLICATIONS

Extended European Search Report dated Jul. 30, 2021 issued in corresponding European Appln. No. 21165447.0.

(Continued)

*Primary Examiner* — Joseph S Del Sole
*Assistant Examiner* — Baileigh Kate Darnell
(74) *Attorney, Agent, or Firm* — Harness, Dickey & Pierce, P.L.C.

(57) ABSTRACT

A fabrication table includes a separable portion and a supporter. The separable portion is formed of a heat-resistant member on which a three-dimensional fabricated object is to be placed. The supporter is formed of a rigid material and configured to support the separable portion.

18 Claims, 9 Drawing Sheets

(56) References Cited

U.S. PATENT DOCUMENTS

2018/0250877 A1\* 9/2018 Okamoto .............. B29C 64/209
2020/0307107 A1\* 10/2020 Madinger ............. B29C 64/245

FOREIGN PATENT DOCUMENTS

| EP | 3372327 A1 | 9/2018 |
|---|---|---|
| JP | 2012-224906 | 11/2012 |
| JP | 2016-153212 | 8/2016 |

OTHER PUBLICATIONS

Chinese Office Action dated Oct. 9, 2022 for corresponding Chinese Patent Application No. 202110344186.2.

\* cited by examiner (a) AT THE END OF FABRICATION (b) REMOVAL OF SURPLUS POWDER IS COMPLETED (c)

(d) TRANSFER TO SINTERING STEP FOR SINTERING

FABRICATION TABLE AND FABRICATING APPARATUS

CROSS-REFERENCE TO RELATED APPLICATION

This patent application is based on and claims priority pursuant to 35 U.S.C. § 119(a) to Japanese Patent Application No. 2020-064446, filed on Mar. 31, 2020, in the Japan Patent Office, the entire disclosure of which is hereby incorporated by reference herein.

BACKGROUND

Technical Field

The present disclosure relates to a fabrication table and a fabricating apparatus.

Description of the Related Art

There is known a binder jetting (BJ) fabricating apparatus that repeats a step of forming a powder material into layers based on three-dimensional data and a step of solidifying the formed layered powder material into a cross-sectional shape of the three-dimensional data to fabricate a three-dimensional object. The fabricated object formed by the BJ method is sintered after unsolidified powder is removed. Thus, a metal fabricated object is fabricated.

There is known a technology in which a fabrication plate is fixed to a support table, the fabrication plate is disposed on the support table so as to be sandwiched by a pair of fixing members fixed on the support table. The fabrication plate is heat-treated to generate warping, and the fabrication plate deformed by the warping is brought into contact with the fixing members to fix the fabrication plate to the support table.

SUMMARY

In an aspect of the present disclosure, a fabrication table includes a separable portion and a supporter. The separable portion is formed of a heat-resistant member on which a three-dimensional fabricated object is to be placed. The supporter is formed of a rigid material and configured to support the separable portion.

In another aspect of the present disclosure, a fabricating apparatus includes a fabricating device and the fabrication table. The fabricating device is configured to fabricate and sinter a three-dimensional fabricated object.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
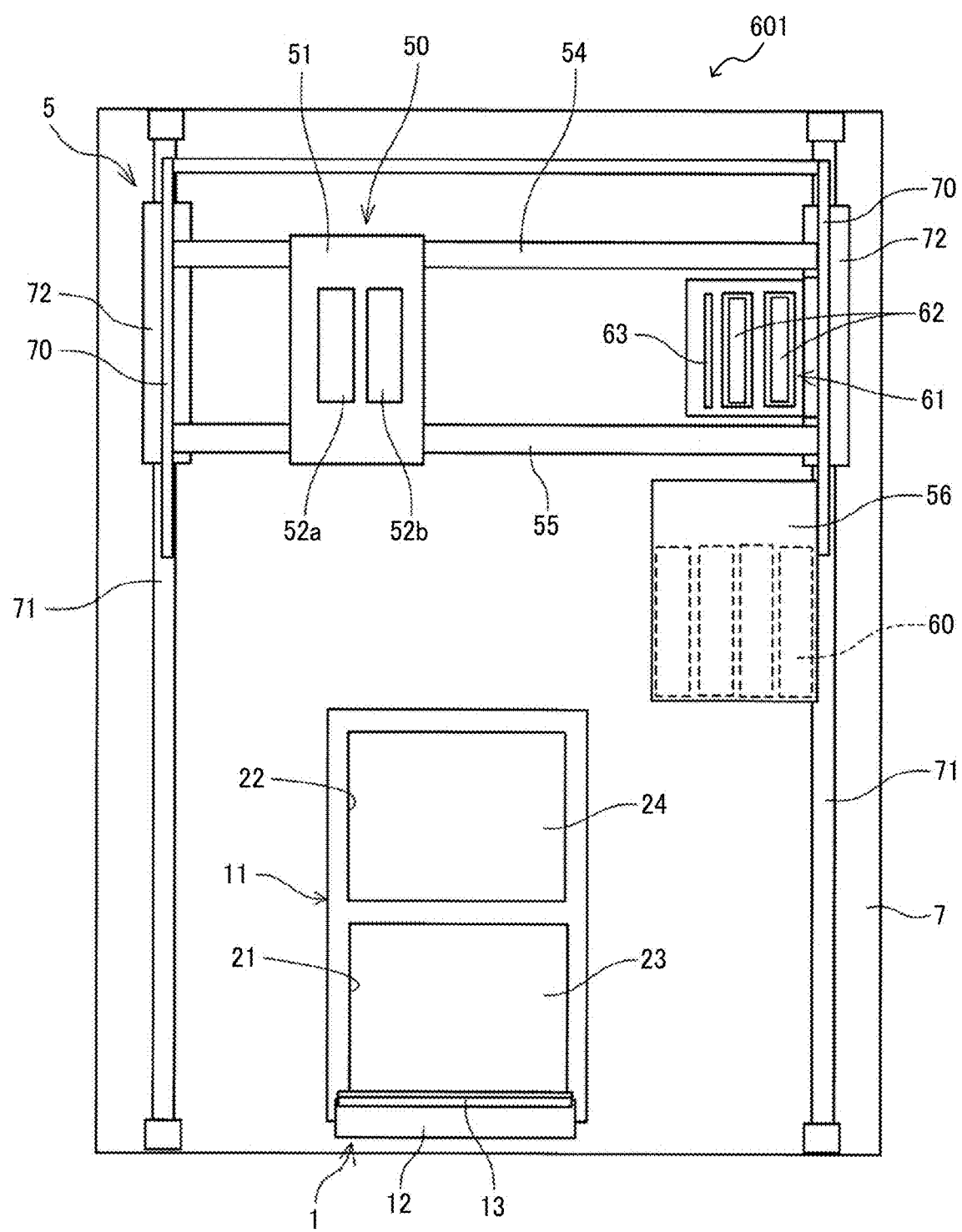
FIG. 1 is a top view of a three-dimensional fabricating apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A three-dimensional fabricating apparatus (also referred to as a powder fabricating apparatus or a powder fabricating apparatus) 601 according to an embodiments of the present disclosure includes a fabricating device 1 and a fabricating unit 5. The fabricating device 1 forms a fabrication layer 30, which is a layered three-dimensional object formed by binding powder (powder). The fabricating unit 5 discharges a fabrication liquid 10 onto a powder layer 31 spread in a layered manner in the fabricating device 1 to fabricate a three-dimensional object.

The fabricating device 1 includes a powder chamber 11 and a flattening roller 12 as a rotator which is a flattening member (recoater). The flattening roller 12 may be, for example, a plate (blade) in place of a rotator.

The powder chamber 11 includes a supply chamber 21 to supply a powder 20 and a fabrication chamber 22 in which the fabrication layer 30 is laminated and a three-dimensional object is fabricated. A bottom of the supply chamber 21 is movable in a vertical direction (height direction) as a supply stage 23. Similarly, a bottom of the fabrication chamber 22 is movable in the vertical direction (height direction) as a fabrication table 24. A three-dimensional object in which the fabrication layer 30 is laminated is fabricated on the fabrication table 24.

Figure 4:
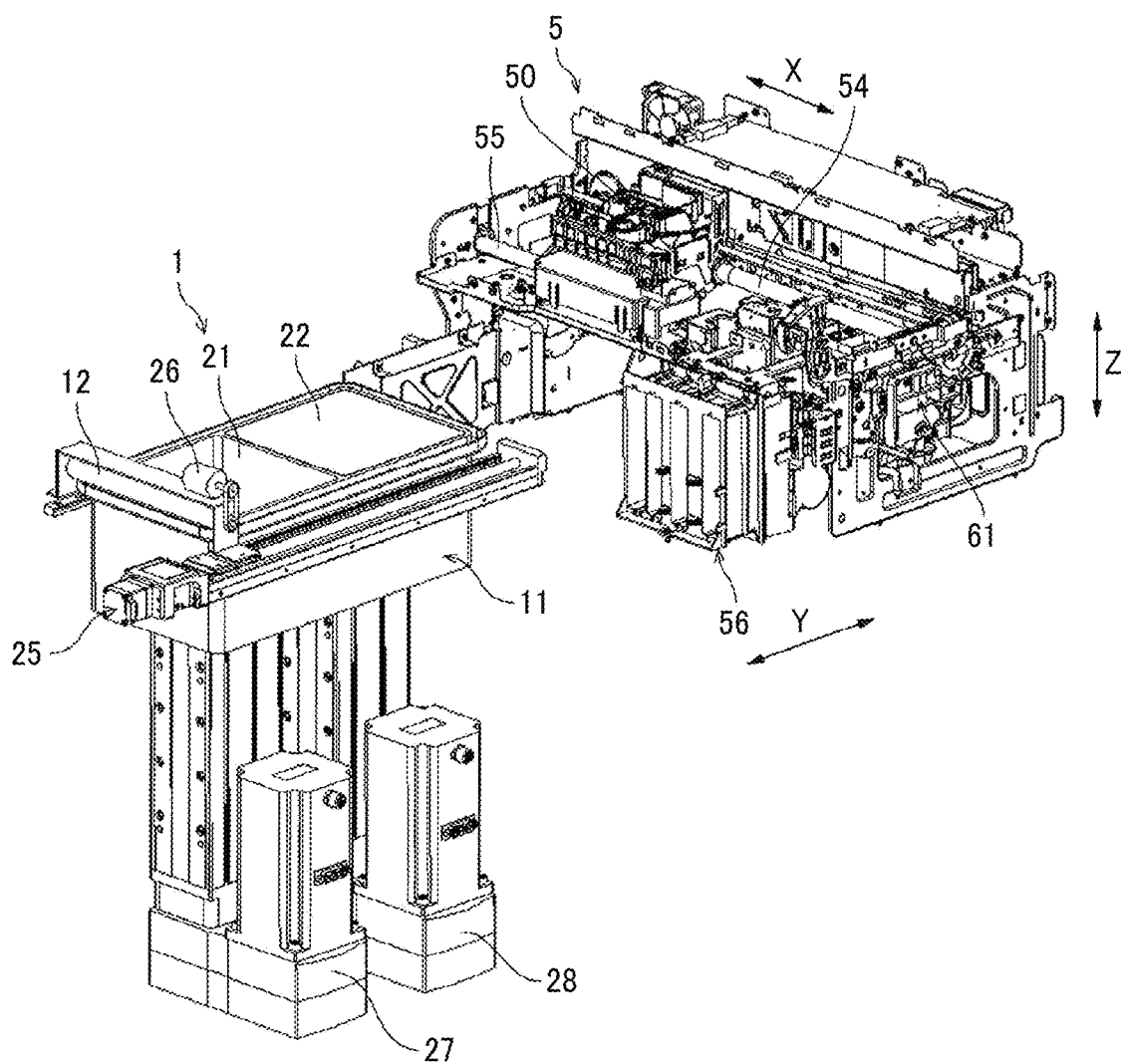
FIG. 4 is a perspective view of a main part of a three-dimensional fabricating apparatus according to an embodiment of the present disclosure.

For example, as illustrated in FIG. 4, the supply stage 23 is moved up and down in directions indicated by arrow Z (height direction) by a motor 27 and the fabrication table 24 is also moved up and down in the directions indicated by arrow Z direction by a motor 28. Hereinafter, the directions indicated by arrow Z simply referred to as "Z directions".

The powder chamber 11 has a box shape, and includes two chambers, i.e., the supply chamber 21 and the fabrication chamber 22, each having an open upper surface. The supply stage 23 is disposed inside the supply chamber 21 and the fabrication table 24 is disposed inside the fabrication chamber 22 so as to be movable up and down.

Side faces of the supply stage 23 are disposed so as to be in contact with inner side faces of the supply chamber 21. Side faces of the fabrication table 24 are disposed so as to be in contact with inner side faces of the fabrication chamber 22. The upper surfaces of the supply stage 23 and the fabrication table 24 are kept horizontal.

Figure 5:
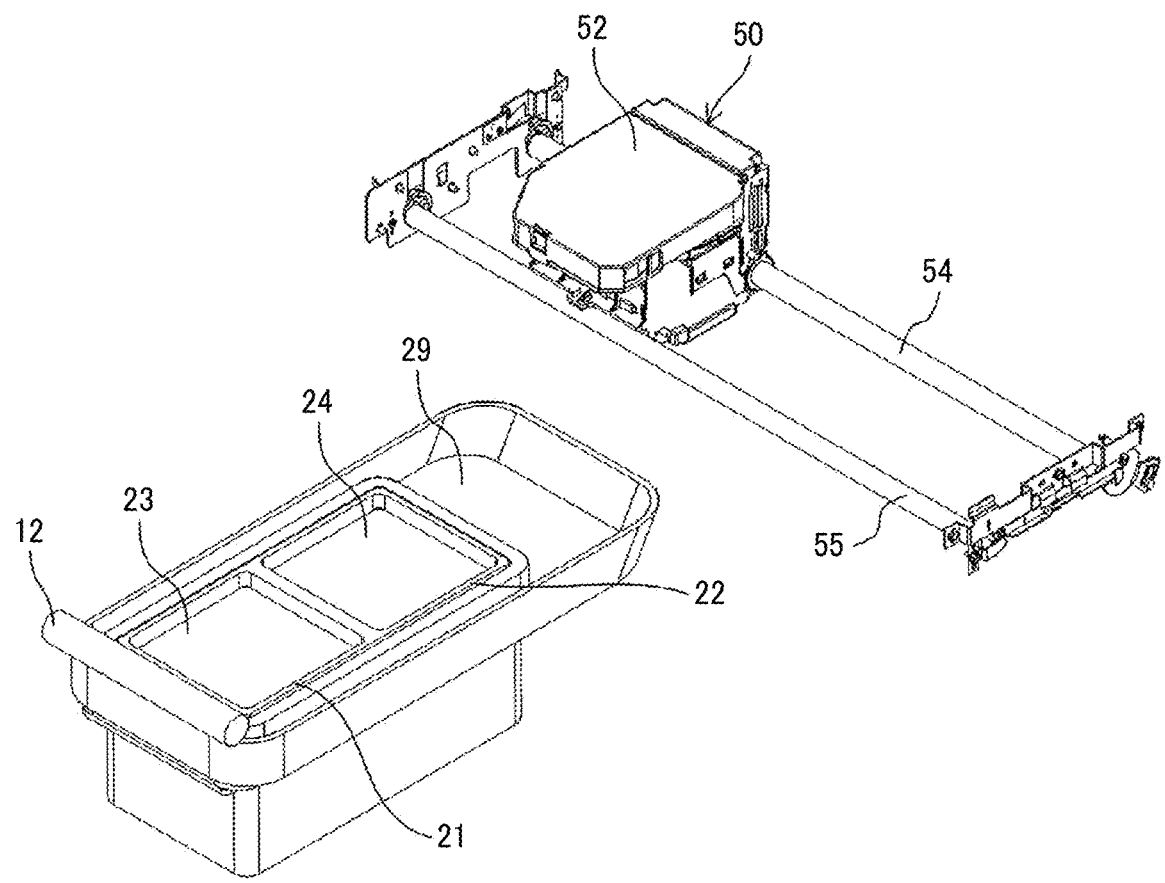
FIG. 5 is a perspective view of a powder chamber and a liquid discharge unit of a three-dimensional fabricating apparatus according to an embodiment of the present disclosure.

As illustrated in FIG. 5, a surplus powder receiving chamber 29 including the peripheries of the supply chamber 21 and the fabrication chamber 22 is provided adjacent to the fabrication chamber 22. The powder 20 is transferred and supplied with the flattening roller 12 when the powder layer 31 is formed, and a surplus of the powder 20 falls to the surplus powder receiving chamber 29. A powder supply device 554 (see FIG. 6) is provided above the supply chamber 21, and the surplus powder 20 that has fallen into the surplus powder receiving chamber 29 is returned to the supply chamber 21 by the powder supply device 554.

During an initial operation of fabricating or when the amount of powder in the supply chamber 21 decreases, the powder 20 in a tank of the powder supply device 554 is supplied to the supply chamber 21. Examples of a method of a conveyance of the powder 20 for powder supply include a screw conveyor method using a screw, an air conveyance method using air, or the like.

The flattening roller 12 supplies the powder 20, which has been supplied onto the supply stage 23 of the supply chamber 21 to the fabrication chamber 22 and flattens the powder 20 to form the powder layer 31. The flattening roller 12 is moved by a reciprocating mechanism 25 so as to be reciprocated in directions indicated by arrow Y direction ((hereinafter, Y directions) illustrated in FIGS. 2 and 4) along a stage surface (surface on which the powder 20 is placed) of the fabrication table 24 relatively to the stage surface. The flattening roller 12 is rotationally driven by a motor 26.

The flattening roller 12 transfers and supplies the powder 20 from the supply chamber 21 to the fabrication chamber 22, and flattens the surface of the powder 20 to form the powder layer 31 which is a layered powder having a predetermined thickness. The flattening roller 12 is a rod-shaped member longer than the inner dimensions (the width of the portion to which the powder is supplied or charged) of each of the fabrication chamber 22 and the supply chamber 21, and is reciprocated in the Y directions (in other words, along a sub-scanning direction) along the stage surface by the reciprocating mechanism 25.

The flattening roller 12 is rotationally driven by the motor 26 illustrated in FIG. 4 and horizontally moves to pass above the supply chamber 21 and the fabrication chamber 22 from the outside of the supply chamber 21. Thus, the powder 20 is transferred and supplied onto the fabrication chamber 22, and the flattening roller 12 flattens the powder 20 while passing over the fabrication chamber 22 to form the powder layer 31.

Figure 2:
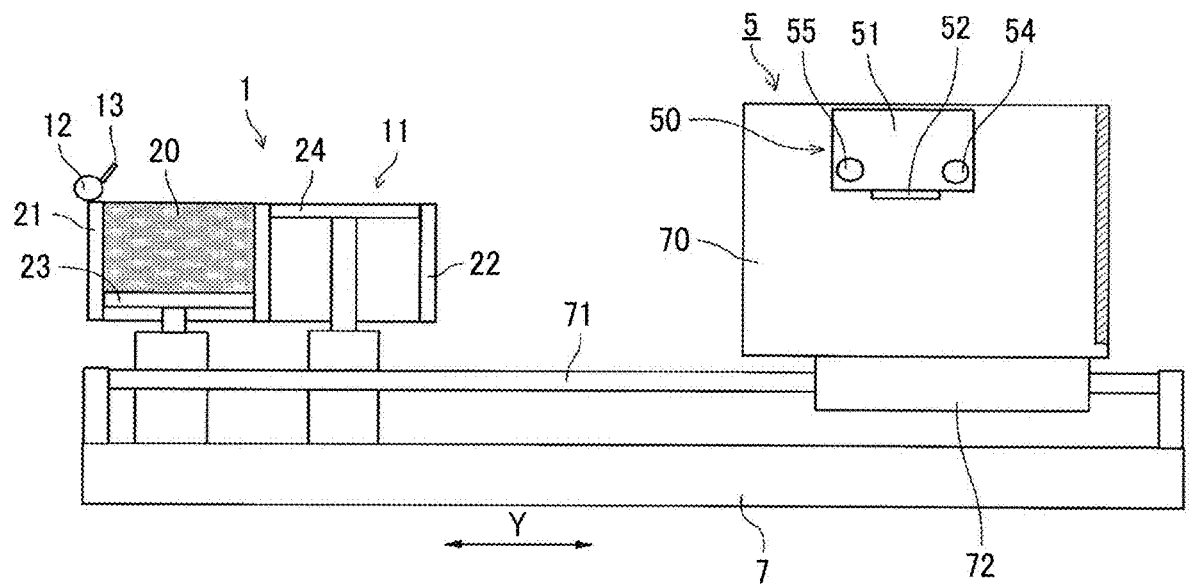
FIG. 2 is a side view of a three-dimensional fabricating apparatus illustrated as being partially cut away, according to an embodiment of the present disclosure.
Figure 3:
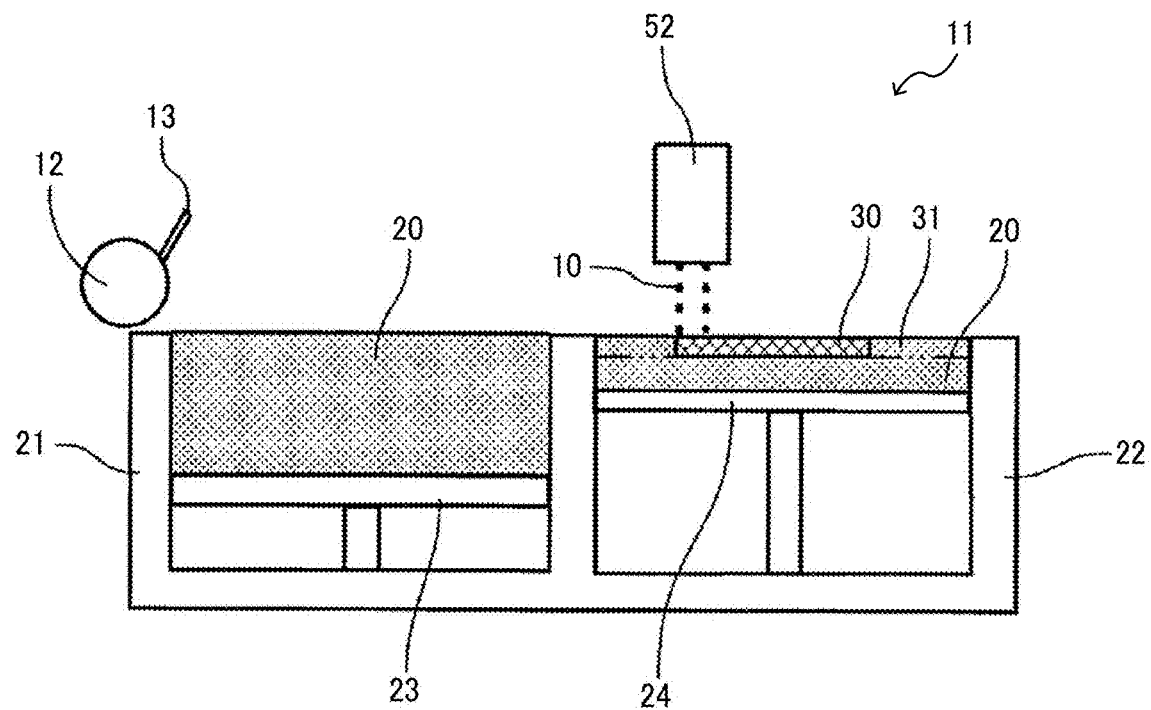
FIG. 3 is a cross-sectional view of a powder chamber of a three-dimensional fabricating apparatus according to an embodiment of the present disclosure.

As illustrated in FIG. 2, the flattening roller 12 is provided with a powder removing plate 13. The powder removing plate 13 moves together with the flattening roller 12 in a state of being in contact with a peripheral surface of the flattening roller 12, and removes the powder 20 adhering to the flattening roller 12.

The three-dimensional fabricating apparatus 601 according to the present embodiment is described on the assumption that the powder chamber 11 of the fabricating device 1 includes two chambers, i.e., the supply chamber 21 and the fabrication chamber 22. However, only the fabrication chamber 22 may be provided, and the powder 20 may be supplied from a powder supply device to the fabrication chamber 22 and flattened by the flattening roller 12.

The fabricating unit 5 includes a liquid discharge unit 50 that discharges the fabrication liquid 10 onto the powder layer 31 on the fabrication table 24. The fabricating unit 5 includes a slider 72 movably held by a guide 71 disposed on a base 7, and the entire fabricating unit 5 can reciprocate in the Y directions (in other words, along the sub-scanning direction) orthogonal to directions indicated by arrow X (hereinafter, X directions) in FIG. 4. The entire fabricating unit 5 is reciprocated in the Y direction by a Y-direction scanning mechanism 552 (illustrated in FIG. 6) described later.

The liquid discharge unit 50 includes a carriage 51 and, for example, two liquid discharge heads (hereinafter simply referred to as "heads") 52a and 52b provided on the carriage 51. Note that the number of heads is not limited to two and may be one or three or more. The liquid discharge unit 50 is provided to be movable up and down in the Z directions illustrated in FIG. 4 together with guides 54 and 55, and is moved up and down in the Z directions by a Z direction lifting mechanism 551 (illustrated in FIG. 6) described later.

The carriage 51 is movably held by the guide 54 and the guide 55. The guide 54 and the guide 55 are held by side plates 70 on both sides of the fabricating unit 5 so as to be raised and lowered. The carriage 51 is reciprocated by an X-direction scanning mechanism 550 (illustrated in FIG. 6), which will be described later, via a main scanning movement mechanism including a motor, a pulley, and a belt, in the X directions that are the main scanning directions. The carriage 51 is provided with a powder post-supply unit that supplies the powder 20 to at least a region to which the fabrication liquid 10 adheres when one fabrication layer 30 is formed in the fabrication chamber 22.

In each of the two heads 52a and 52b (hereinafter, referred to as "heads 52" unless distinguished), two nozzle rows are arranged in which a plurality of nozzles that discharge the fabrication liquid 10 are arranged. The head configuration and the liquid to be discharged are not limited to the above-described configuration. A plurality of tanks 60 containing the above-described liquids are mounted on a tank mounter 56. The liquid in each tank 60 is supplied to the head 52a and 52b via supply tubes or the like.

A maintenance mechanism 61 that performs maintenance and recovery of the heads 52 of the liquid discharge unit 50 is provided on one side in the X direction. The maintenance mechanism 61 includes caps 62 and a wiper 63. The maintenance mechanism 61 brings the caps 62 into close contact with the nozzle surfaces (the surface on which the nozzles are formed) of the heads 52 and sucks the fabricating liquid from the nozzles. Thus, the powder clogged in the nozzles and the fabricating liquid having a high viscosity can be discharged. Thereafter, the nozzle surfaces of the heads 52 are wiped by the wiper 63 to form meniscuses of the nozzles in a state in which the inside of the nozzles is in a negative pressure state. When the fabrication liquid 10 is not discharged, the maintenance mechanism 61 covers the nozzle surfaces of the heads 52 with the caps 62 to prevent mixing of the powder 20 into the nozzles and drying of the fabrication liquid 10.

Hardware Configuration

Figure 6:
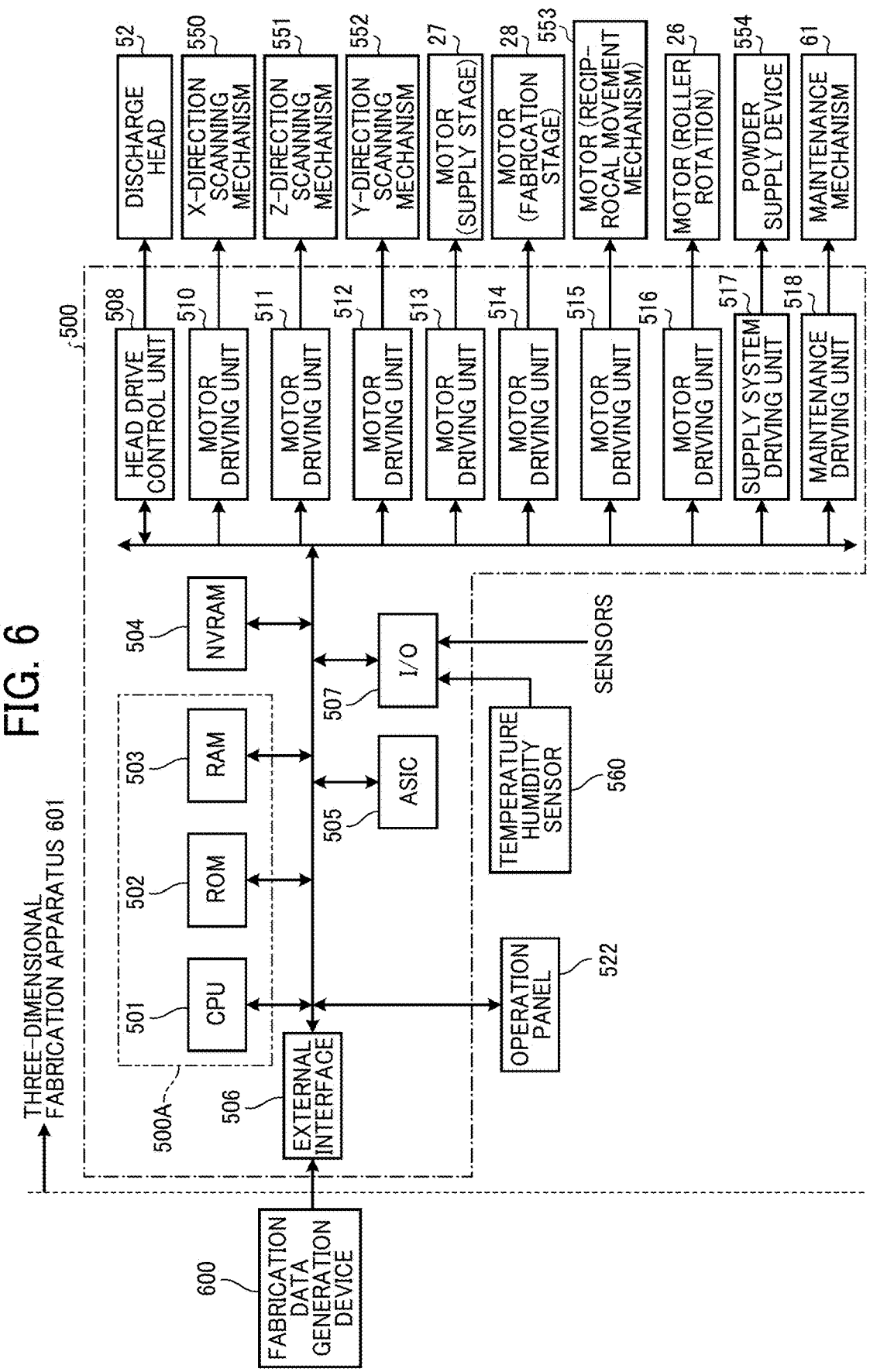
FIG. 6 is a block diagram of a hardware configuration of a three-dimensional fabricating apparatus according to an embodiment of the present disclosure.

FIG. 6 is a block diagram of a hardware configuration of the three-dimensional fabricating apparatus 601 according to an embodiment of the present disclosure. In FIG. 6, a controller 500 of the three-dimensional fabricating apparatus 601 includes a central processing unit (CPU) 501, a read only memory (ROM) 502, a random access memory (RAM) 503, and a non-volatile random access memory (NVRAM) 504. The CPU 501 controls the entire three-dimensional fabricating apparatus 601. The ROM 502 stores not only various programs such as a fabrication program for causing the CPU 501 to execute three-dimensional fabrication control but also fixed data and the like. The RAM 503 temporarily stores fabrication data and the like. The NVRAM 504 is a non-volatile memory that retains data while the device is powered off. The CPU 501, the ROM 502, and the RAM 503 mainly form a main controller 500A.

The controller 500 includes an application specific integrated circuit (ASIC) 505 that processes input and output signals for controlling the entire three-dimensional fabricating apparatus 601 in addition to various signal processing performed on image data. The controller 500 includes an external interface (external I/F) 506 for transmitting and receiving fabrication data and the like to and from a fabrication data generation apparatus 600, which is an external device.

The fabrication data generation apparatus 600 is an apparatus that generates fabrication data obtained by slicing a fabricated object in a final form into fabrication layers, and includes an information processing apparatus such as a personal computer.

Further, the controller 500 includes an input and output unit (I/O) 507 for capturing detection signals of various sensors, and a head drive control unit 508 that controls driving of each of the heads 52 of the liquid discharge unit 50.

The controller 500 includes a motor driver 510 that drives a motor of the X-direction scanning mechanism 550 to move the carriage 51 of the liquid discharge unit 50 in the X directions (i.e. the main scanning directions), and a motor driver 512 that drives a motor of the Y-direction scanning mechanism 552 to move the fabricating unit 5 in the Y directions (or along the sub-scanning direction).

In addition, the controller 500 includes a motor driving unit 511 that drives a motor of a Z direction lifting mechanism 551 to move (i.e. lift up and down) the carriage 51 of the liquid discharge unit 50 in the Z directions. The elevation in the Z directions may elevate the entire fabricating unit 5.

The controller 500 includes a motor driver 513 that drives the motor 27 to vertically move the supply stage 23, and a motor driver 514 that drives the motor 28 to vertically move the fabrication table 24. The controller 500 includes a motor driver 515 that drives the motor 553 of the reciprocating mechanism 25 for moving the flattening roller 12, and a motor driver 516 that drives the motor 26 for rotationally driving the flattening roller 12.

Further, the controller 500 includes a supply system driver 517 that drives the powder supply device 554 to supply the powder 20 to the supply chamber 21, and a maintenance driver 518 that drives the maintenance mechanism 61 of the liquid discharge unit 50.

The I/O 507 of the controller 500 is supplied with detection signals indicating temperature and moisture as environmental conditions of the three-dimensional fabricating apparatus 601, which are detected by a temperature and moisture sensor 560, and is also supplied with detection signals of other sensors. An operation panel 522 for inputting and displaying information necessary for the three-dimensional fabricating apparatus 601 is connected to the controller 500.

Note that a three-dimensional fabricating system includes the fabrication data generation apparatus 600 and the three-dimensional fabricating apparatus 601.

Fabricating Operation

Figure 7A:
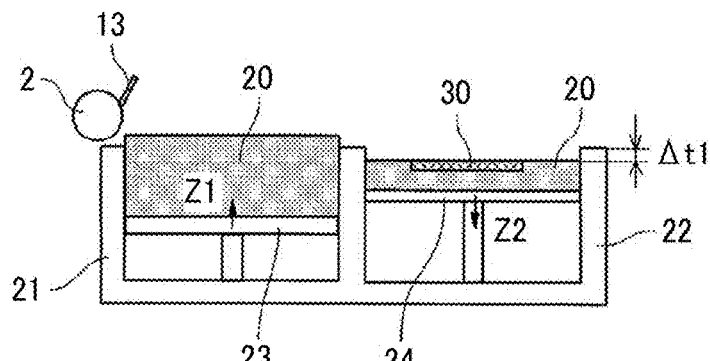
FIGS. 7A, 7B, 7C, 7D, and 7E are illustrations of an operation flow in which a three-dimensional fabricating apparatus fabricates a fabricated object according to an embodiment of the present disclosure.

FIGS. 7A, 7B, 7C, 7D, and 7E are diagrams of an operation flow in which the three-dimensional fabricating apparatus 601 fabricates a fabricated object according to an embodiment of the present disclosure. FIG. 7A illustrates a state in which the first fabrication layer 30 is formed on the fabrication table 24 of the fabrication chamber 22. When the next fabrication layer 30 is formed on the fabrication layer 30, as illustrated in FIG. 7A, the supply stage 23 of the supply chamber 21 is raised in a Z1 direction, and the fabrication table 24 of the fabrication chamber 22 is lowered in a Z2 direction. At this time, the lowering distance of the fabrication table 24 is set so that the interval between an upper surface of the fabrication chamber 22 (an upper surface of the powder layer) and a lower portion of the flattening roller 12 (a lower tangential portion) is $\Delta t1$. The interval $\Delta t1$ corresponds to the thickness of a powder layer 31 to be formed next. As an example, the interval $\Delta t1$ is about several tens to 100 μm.

Figure 7B:
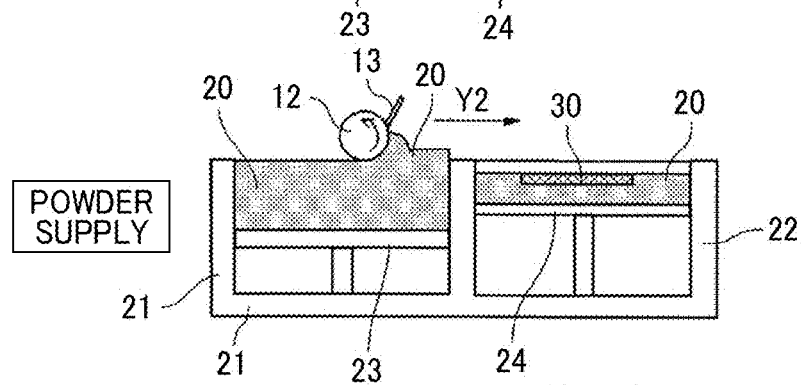

Subsequently, as illustrated in FIG. 7B, the flattening roller 12 is moved in a Y2 direction (toward the fabrication chamber 22) while the flattening roller 12 is rotated in a forward direction (i.e., a direction indicated by arrow inside the flattening roller 12 in FIG. 7B). Thus, the powder 20 located above the upper surface level of the supply chamber 21 is transferred and supplied to the fabrication chamber 22 (powder supply).

Figure 7C:
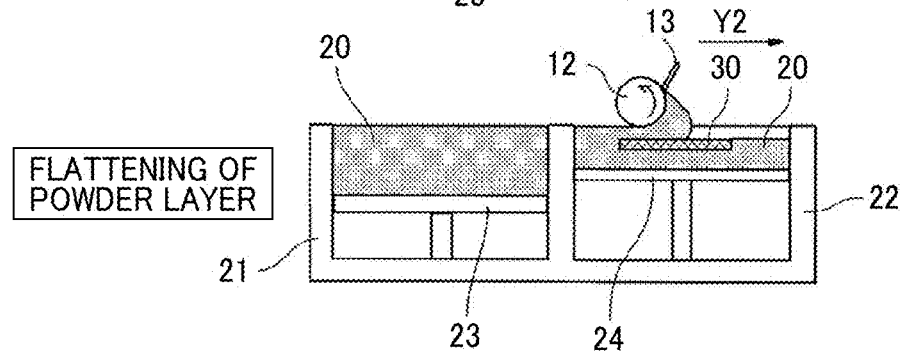
Figure 7D:
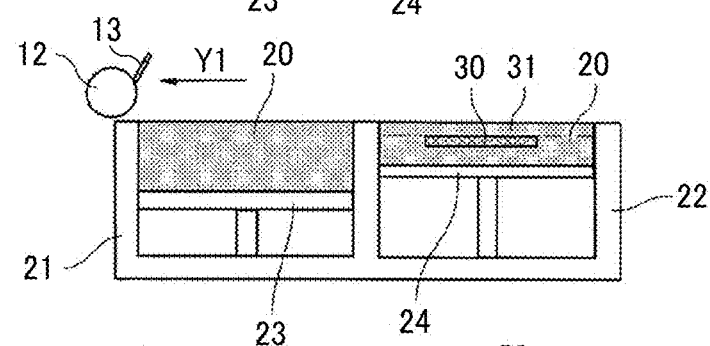

Furthermore, as illustrated in FIG. 7C, the flattening roller 12 is moved in parallel with the stage surface of the fabrication table 24 of the fabrication chamber 22 to form, as illustrated in FIG. 7D, the powder layer 31 having the predetermined thickness $\Delta t1$ on the fabrication layer 30 of the fabrication table 24 (flattening). After the powder layer 31 is formed, the flattening roller 12 is moved in the Y1 direction and returned to the initial position as illustrated in FIG. 7D.

In the present embodiment, the flattening roller 12 can move while maintaining a constant distance from the upper surface levels of the fabrication chamber 22 and the supply chamber 21. The flattening roller 12 that can move while maintaining the constant distance from the upper surface levels of the fabrication chamber 22 and the supply chamber 21 allows to form the powder layer 31 having a uniform thickness $\Delta t1$ on the fabrication chamber 22 or on the fabrication layer 30 that has been already formed while conveying the powder 20 onto the fabrication chamber 22 by the flattening roller 12.

Figure 7E:
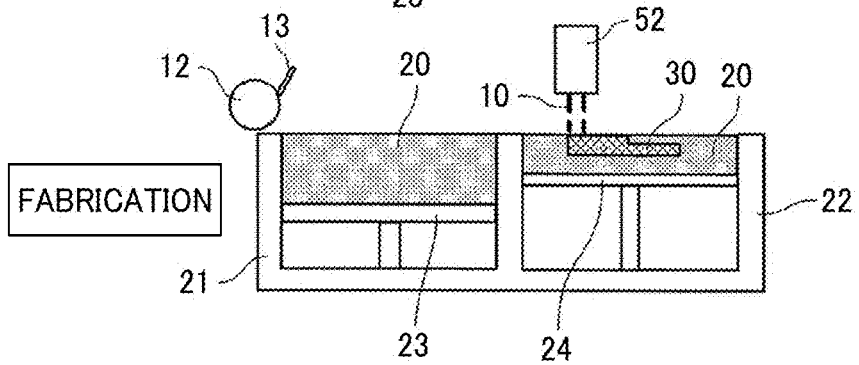

Then, as illustrated in FIG. 7E, droplets of fabrication liquid 10 are discharged from the heads 52 of the liquid discharge unit 50 to form and laminate the fabrication layer 30 on the next powder layer 31 (fabrication).

Note that, for the fabrication layer 30, for example, when the fabrication liquid 10 discharged from the heads 52 is mixed with the powder 20, adhesives contained in the powder 20 dissolve and bond together. Thus, particles of the powder 20 bind together to form the fabrication layer 30.

Subsequently, the above-described step of forming the powder layer 31 by supplying and flattening the powder 20 and the above-described step of discharging fabrication liquid 10 by the heads 52 are repeated to form a new fabrication layer 30. At this time, the new fabrication layer 30 and the fabrication layer 30 thereunder are integrated to constitute a part of a three-dimensional fabricated object.

Then, the step of forming the powder layer 31 by supplying and flattening the powder 20 and the step of discharging the fabrication liquid with the heads 52 are repeated a required number of times to complete the fabrication of the three-dimensional fabrication object (fabricated object).

Configuration of Fabrication Table

Figure 8A:
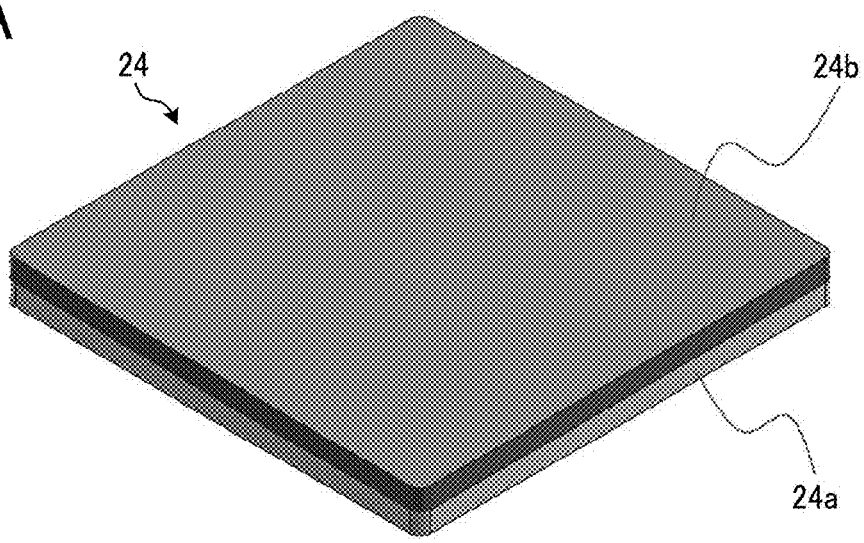
FIG. 8A is a perspective view of a fabrication table of a three-dimensional fabricating apparatus according to an embodiment of the present disclosure.
Figure 8B:
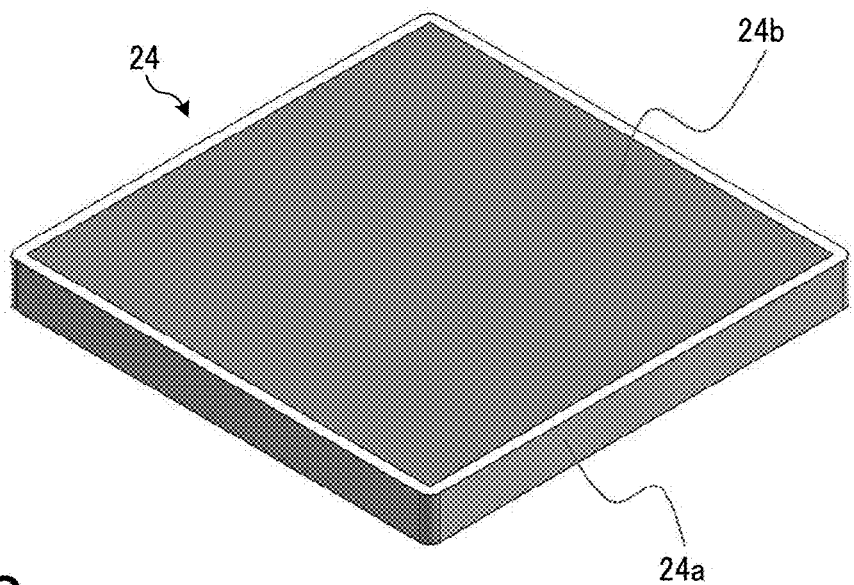
FIG. 8B is a view of a fabrication table of a three-dimensional fabricating apparatus according to a first variation of the present disclosure.
Figure 8C:
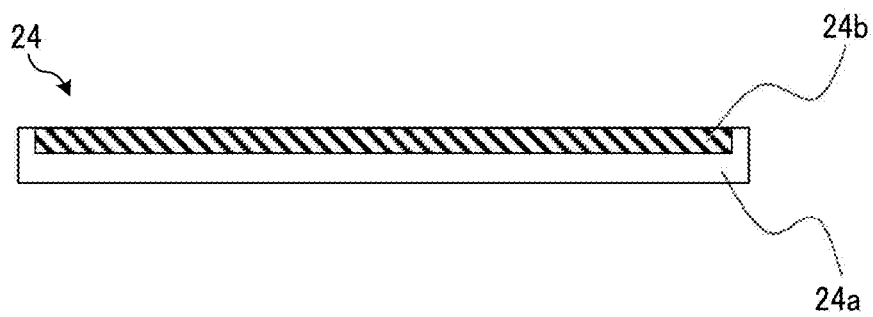
FIG. 8C is a cross-sectional side view of the fabrication table of FIG. 8B.

FIGS. 8A, 8B, and 8C are views of the fabrication table 24 used in the three-dimensional fabricating apparatus 601 according to an embodiment of the present disclosure. FIG. 8A is a perspective view of the fabrication table 24 viewed from a placement surface on which the fabricated object is placed. As illustrated in FIG. 8A, the fabrication table 24 includes a supporter 24a having a plate shape of, for example, a quadrangular shape, which may be another shape such as a circular shape, a triangular shape, or a polygonal shape, and a separable portion 24b having a plate shape of a quadrangular shape substantially the same as the supporter 24a. The separable portion 24b is stacked on the supporter 24a.

As described above, the supporter 24a is moved up and down in the Z directions illustrated in FIG. 4 by the motor 28. The separable portion 24b placed on the supporter 24a is also moved up and down together with the supporter 24a. The supporter 24a is formed of, for example, a rigid material, for example, metal such as steel. On the other hand, the separable portion 24b is formed of ceramics which is a heat resistant member. The separable portion 24b has a melting point higher than a melting point of the powder 20. The separable portion 24b can be separated from the supporter 24a and moved in a state in which a green body is placed on the separable portion 24b.

In the case of the above-described fabrication table 24, the load of the fabricated object is entirely applied via the separable portion 24b to the supporter 24a positioned below the separable portion 24b. The supporter 24a is formed of a rigid material such as metal. Thus, the supporter 24a can sufficiently withstand the load of the fabricated object, and the separable portion 24b is not damaged. The separable portion 24b can be separated from the supporter 24a. Therefore, in a state in which the green body is placed on the separable portion 24b, the separable portion 24b can be separated from the supporter 24a and moved, and the process can proceed to the sintering step.

Fabrication Table According to First Variation

FIG. 8A illustrates the example in which the supporter 24a and the separable portion 24b of the fabrication table 24 have the same shape. However, in examples illustrated in FIGS. 8B and 8C, the fabrication table 24 is formed such that the size of the separable portion 24b is slightly smaller than the size of the supporter 24a and the separable portion 24b is accommodated in the supporter 24a.

That is, FIG. 8B is a perspective view of the fabrication table 24 according to the first variation in which the fabrication table 24 is viewed from the supporter 24a side. FIG. 8C is a cross-sectional view of the fabrication table 24 according to the first variation. As apparent from FIGS. 8B and 8C, in the fabrication table 24 according to the first variation, the supporter 24a has a bottomed box shape, and the separable portion 24b is accommodated in the supporter 24a.

The supporter 24a is formed of, for example, a rigid material such as steel (metallic material or the like), and the separable portion 24b is formed of ceramics which is a heat-resistant member. The separable portion 24b can be separated from the supporter 24a and moved in a state in which a green body is placed on the separable portion 24b.

In the fabrication table 24 according to the first variation, the load of the fabricated object is also entirely applied via the separable portion 24b to the supporter 24a positioned below the separable portion 24b. The supporter 24a is formed of a rigid material such as metal. Thus, the supporter 24a can sufficiently withstand the load of the fabricated object, and the separable portion 24b is not damaged. In addition, the separable portion 24b can be separated from the supporter 24a. Therefore, in a state in which the green body is placed on the separable portion 24b, the separable portion 24b can be separated from the supporter 24a and moved, and the process can proceed to the sintering step.

In the case of the first variation, the bottom surface and the side surface of the separable portion 24b are substantially in contact with the supporter 24a. The outer peripherals of the fabrication table 24 are in contact with the walls of the fabrication chamber 22 during fabricating to prevent the powder 20 from passing through. However, the above-described configuration according to the first variation can prevent the separable portion 24b from being damaged. The behavior of the powder 20 at the time of powder layering is different in the vicinity of the wall surfaces of the fabrication chamber 22 (for example, an area of approximately 1 mm to 5 mm from the wall surface) from a center portion of the fabrication chamber 22 and the fabricated object is not normally disposed in the vicinity of the wall surfaces of the fabrication chamber 22. Accordingly, there is no disadvantage due to the above-described configuration according to the first variation.

Transition to Sintering Step

Figure 9:
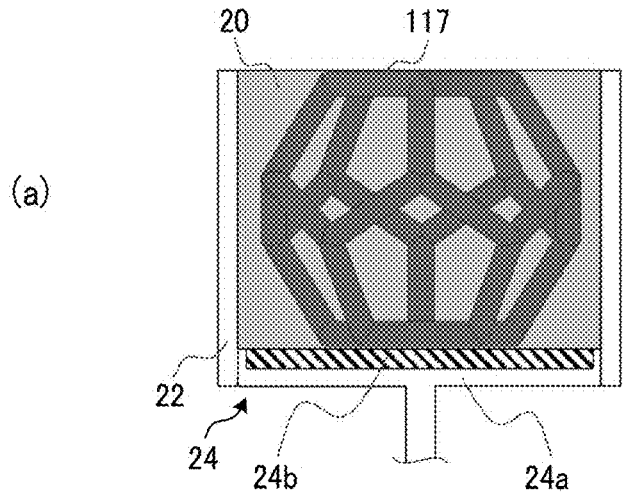
FIG. 9 is an illustration of an operational flow in which a fabricated green body is transferred to a sintering step according to an embodiment of the present disclosure.
Figure 9:
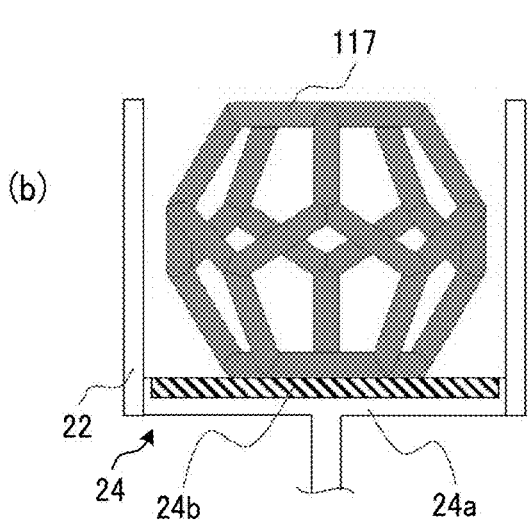
Figure 9:
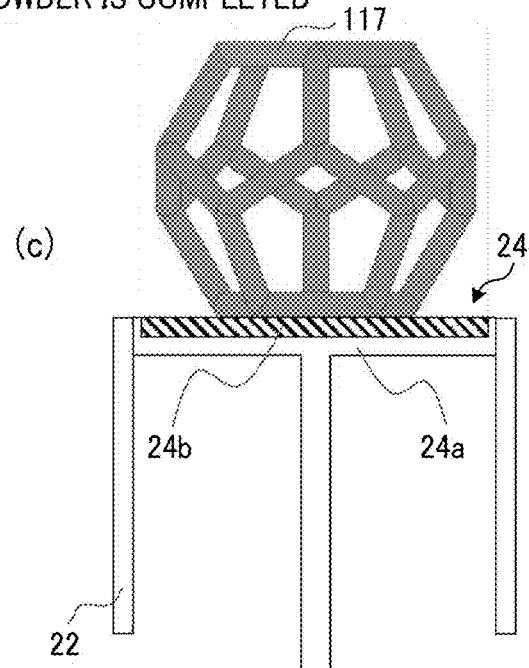
Figure 9:
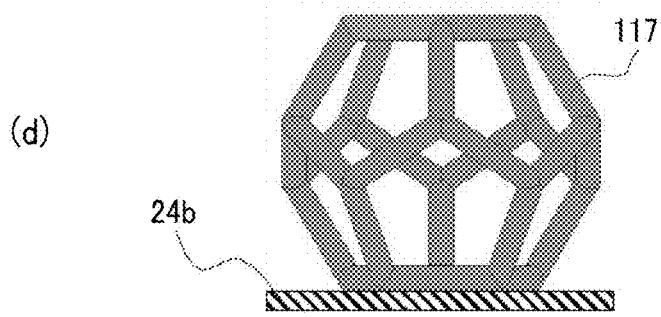

Parts (a), (b), (c), and (d) of FIG. 9 are illustrations of an operational flow in which a fabricated green body is transferred to the sintering step according to an embodiment of the present disclosure. Parts (a), (b), (c), and (d) of FIG. 9 illustrate an example in which the fabrication table 24 according to the first variation described with reference to FIGS. 8B and 8C is provided as the fabrication table 24.

Part (a) of FIG. 9 is a cross-sectional view of the fabrication chamber 22 in which the inside of the fabrication chamber 22 at the end of fabricating of a fabricated object is transparently illustrated. Part (b) of FIG. 9 is a cross-sectional view of the fabrication chamber 22 in which the inside of the fabrication chamber 22 after the removal of the surplus powder is transparently illustrated. Part (c) of FIG. 9 is a cross-sectional view of the separable portion 24b from which the surplus powder has been removed and on which a three-dimensional object is placed immediately before the transition to the sintering step. Part (d) of FIG. 9 is a cross-sectional view of the separable portion 24b separated from the supporter 24a and transferred to the sintering step.

As described with reference to FIGS. 8B and 8C, the fabrication table 24 includes the supporter 24a and the separable portion 24b. The separable portion 24b is separable from the supporter 24a. During fabricating, the separable portion 24b is fixed to the supporter 24a. However, the separable portion 24b can be taken out to the outside of the three-dimensional fabricating apparatus 601 or the outside of the fabrication chamber 22 after the end of fabricating.

The supporter 24a is formed of metal such as aluminum, steel, or stainless steel. The separable portion 24b is formed of ceramic such as alumina, magnesia, or zirconia.

The steps from the end of fabrication of the fabricated object illustrated in part (a) of FIG. 9 to the removal of the unsolidified powder material illustrated in part (b) of FIG. 9 are performed in the fabrication chamber 22. Subsequently, when the process proceeds to the sintering step, as illustrated in part (c) and (d) of FIG. 9, a fabricated object 117 is transferred together with the separable portion 24b and is sintered.

Even when the fabricated object (green body) 117 has a weak strength due to, for example, a fine shape or the like, the separable portion 24b on which the fabricated object (green body) 117 is placed can be transferred from the three-dimensional fabricating apparatus 601 or the fabrication chamber 22 to the sintering step by a robot arm, a belt conveyor, or the like. Therefore, the process from the fabricating step to the sintering step of the fabricated object 117 can be automated.

Note that even if the material of the separable portion 24b is other than ceramics, the same effect as described above can be obtained by using a material that is sintered under different conditions from the powder 20 and has a melting point higher than the sintering temperature of the powder material. The powder 20 may be sintered or fired using a material other than metal.

Further, in the case of using a method of immersing the unsolidified powder in a liquid (removing liquid) such as water or a solvent when removing the unsolidified powder, the unsolidified powder can be efficiently removed by making the separable portion 24b of a material resistant to the removing liquid.

Second Variation

Figure 10A:
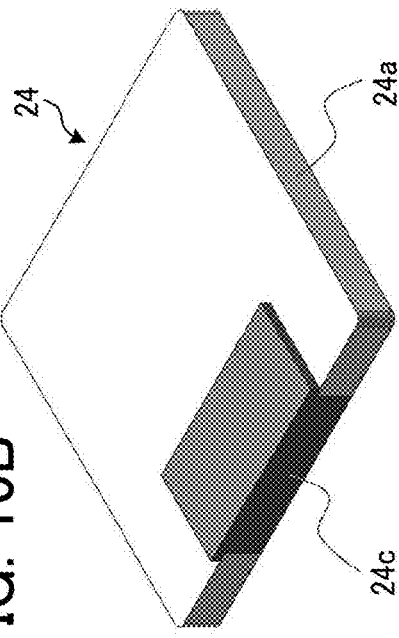
FIGS. 10A, 10B, 10C, and 10D are perspective views of a fabrication table according to a second variation of the present disclosure.
Figure 10B:
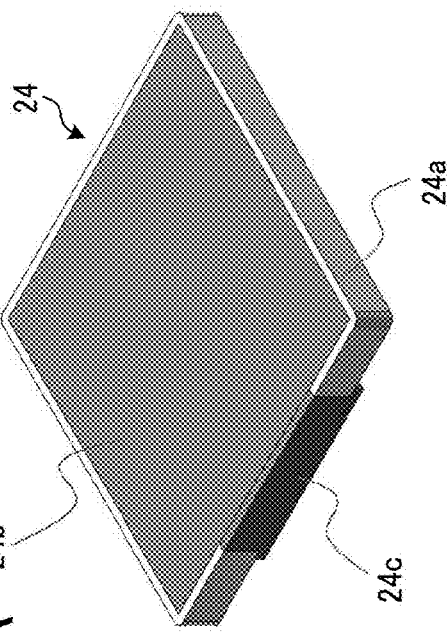
Figure 10C:
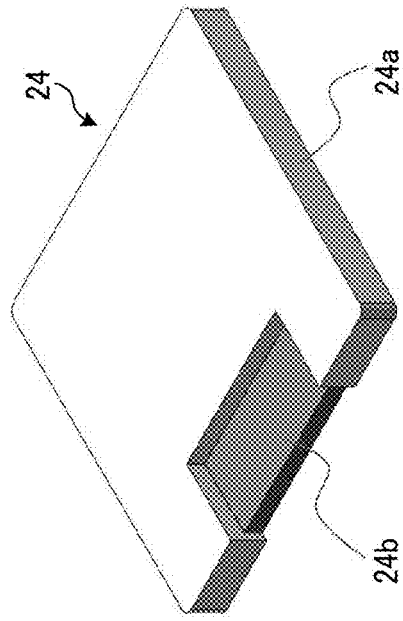
Figure 10D:
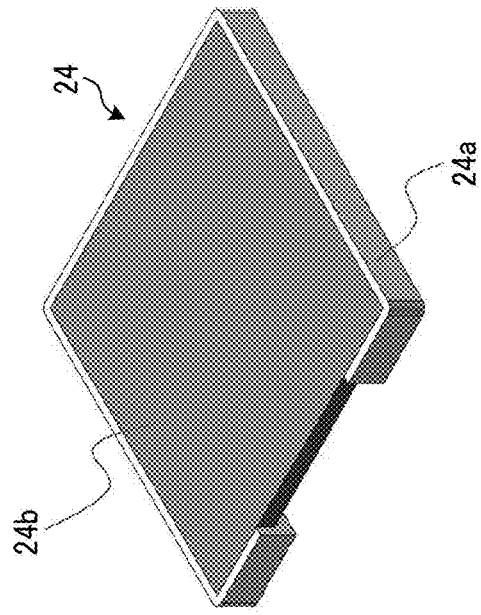

FIGS. 10A, 10B, 10C, and 10D are perspective views of a fabrication table 24 according to a second variation of the present disclosure. FIG. 10A is a perspective view of the fabrication table 24 according to the second variation as viewed from a placement surface side (upper surface side) of a fabricated object. FIG. 10B is a perspective view of the fabrication table 24 according to the second variation as viewed from a side (bottom surface side) opposite to the placement surface side (upper surface side) on which the fabricated object is placed. FIG. 10C is a perspective view of the fabrication table 24 in a state in which a second separable portion 24c provided in the fabrication table 24 according to the second variation is removed, as viewed from the placement surface side (upper surface side) of the fabricated object. FIG. 10D is a perspective view of the fabrication table 24 in a state in which the second separable portion 24c provided in the fabrication table 24 according to the second variation is removed, as viewed from the side (bottom surface side) opposite to the placement surface side (upper surface side) on which the fabricated object is placed.

The fabrication table 24 according to the second variation includes the second separable portion 24c (as an example of a separable portion for partial exposing) in addition to the supporter 24a and the separable portion 24b (or the first separable portion 24b) described above. The supporter 24a and the second separable portion 24c are formed, for example, of the same material such as metals. When the second separable portion 24c is removed from the fabrication table 24, as illustrated in FIG. 10D, a portion of the first separable portion 24b is exposed.

With such a configuration, when a fabricated object 117 (green body) after the completion of fabrication is taken out of the three-dimensional fabricating apparatus 601 or the fabrication chamber 22, the first separable portion 24b can be gripped by a robot arm or the like. Thus, the transfer of the fabricated object 117 to the sintering step can be facilitated. As a result, automation from the fabricating step to the sintering step of the fabricated object 117 can be more easily realized.

Effects of Embodiments

As apparent from the above descriptions, the three-dimensional fabricating apparatus 601 according to embodiments of the present disclosure includes the fabrication table 24 including the supporter 24a formed of a rigid material and the separable portion 24b formed of a heat-resistant material. After the completion of the fabricating, the separable portion 24b on which the fabricated object is placed is separated from the supporter 24a by, for example, a robot arm or the like and transferred, and the process proceeds to the sintering step. Thus, automating the process from the fabricating step to the sintering step can be realized.

In addition, the fabricated object after completion of fabricating is not directly gripped and transferred by a robot arm or the like. However, the separable portion 24b on which the fabricated object after completion of fabricating is placed is gripped and transferred. Therefore, even a fabricated object (green body) having a delicate structure can be transferred to the sintering step without being damaged.

The above-described embodiments are presented as examples and are not intended to limit the scope of the present disclosure. The above-described embodiments can be implemented in other various forms, and various omissions, replacements, and changes can be made without departing from the scope of the disclosure. In addition, the embodiments and modifications or variations thereof are included in the scope and the gist of the disclosure.

What is claimed is:

1. A fabricating apparatus comprising:
   a fabricating device configured to fabricate and sinter a three-dimensional fabricated object; and
   a fabrication chamber, the fabrication chamber including walls forming a periphery of the fabrication chamber,
   a fabrication table which includes
      a separable portion formed of a heat-resistant member on which a three-dimensional fabricated object is to be placed; and
      a supporter formed of a rigid material secured to the fabricating device and configured to support the separable portion during a fabrication of the three-dimensional fabricated object, outer peripherals of the supporter configured to be in contact with the walls during fabrication,
   the separable portion configured to separate from the supporter and walls, and to carry the three-dimensional fabricated object during transport to a sintering step.

2. The fabricating apparatus according to claim 1, wherein the supporter has a bottomed box shape, and wherein the separable portion is detachably accommodated in the supporter having the bottomed box shape.

3. The fabricating apparatus according to claim 2, wherein the separable portion is accommodated in the supporter having the bottomed box shape in a state of being in contact with the supporter without a gap.

4. The fabricating apparatus according to claim 2, wherein the supporter having the bottomed box shape includes another separable portion configured to be separable from the supporter, and
wherein said another separable portion is configured to expose a part of the separable portion accommodated in the supporter.

5. The fabricating apparatus according to claim 4, wherein the supporter includes an opening on a side surface and a bottom surface to interface with the another separable portion.

6. The fabricating apparatus according to claim 5, wherein the another separable portion has an L-shape cross section and is configured to contact both the support and the separable portion.

7. The fabricating apparatus according to claim 6, wherein the another separable portion is configured to detachably interface with the opening of the supporter to contact a bottom surface of the separable portion and a side surface of the separable portion.

8. The fabricating apparatus according to claim 1, wherein the separable portion has a melting point higher than a melting point of powder for fabricating the three-dimensional fabricated object.

9. The fabricating apparatus according to claim 1, wherein the supporter is formed of metal, and
wherein the separable portion is formed of a ceramic member.

10. The fabricating apparatus according to claim 1, wherein the separable portion has a plate shape.

11. The fabricating apparatus according to claim 1, further including a robot arm configured to transfer the three-dimensional fabricated object to the sintering step by gripping an exposed part of the separable portion.

12. The fabricating apparatus according to claim 1, wherein the fabricating device further includes a motor configured to raise and lower the fabrication table in the fabrication chamber.

13. A fabricating apparatus comprising:
a fabricating device configured to fabricate and sinter a three-dimensional fabricated object; and
a fabrication table including
    a first separable portion formed of a heat-resistant member on which a three-dimensional fabricated object is to be placed,
    a supporter formed of a rigid material secured to the fabricating device and configured to support the first separable portion during a fabrication of the three-dimensional fabricated object, and
    a second separable portion, configured to interface with a side surface of the first separable portion, a bottom surface of the first separable portion and a groove of the supporter such that removal of the second separable portion exposes a bottom surfaces of the first separate portion, the groove being an opening on a side surface and a bottom surface of the supporter,
the first separable portion configured to separate from the supporter and carry the three-dimensional fabricated object during transport to a sintering step.

14. The fabricating apparatus according to claim 13, wherein the supporter has a bottomed box shape, and
wherein the first separable portion is detachably accommodated in the supporter having the bottomed box shape.

15. The fabricating apparatus according to claim 14, wherein the first separable portion is accommodated in the supporter having the bottomed box shape in a state of being in contact with the supporter without a gap.

16. The fabricating apparatus according to claim 13, wherein the first separable portion has a melting point higher than a melting point of powder for fabricating the three-dimensional fabricated object.

17. The fabricating apparatus according to claim 13, wherein the supporter is formed of metal,
wherein the first separable portion is formed of a ceramic member, and
wherein the second separable portion is formed of the ceramic member.

18. The fabricating apparatus according to claim 13, wherein the first separable portion has a plate shape.

* * * * *